(12) United States Patent
Sun

(10) Patent No.: US 10,791,406 B2
(45) Date of Patent: Sep. 29, 2020

(54) METHOD AND APPARATUS FOR PROCESSING SOUND HOLE OF SPEAKER AND ELECTRONIC DEVICE

(71) Applicant: Guangdong OPPO Mobile Telecommunications Corp., Ltd., Dongguan, Guangdong (CN)

(72) Inventor: Lu Sun, Guangdong (CN)

(73) Assignee: GUANGDONG OPPO MOBILE TELEOCMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/557,188

(22) Filed: Aug. 30, 2019

(65) Prior Publication Data

US 2019/0387336 A1 Dec. 19, 2019

Related U.S. Application Data

(63) Continuation of application No. PCT/CN2018/075522, filed on Feb. 7, 2018.

(30) Foreign Application Priority Data

Mar. 3, 2017 (CN) .......................... 2017 1 0123610

(51) Int. Cl.
*H04R 29/00* (2006.01)
*G06F 3/16* (2006.01)
*H04R 1/02* (2006.01)

(52) U.S. Cl.
CPC ........... *H04R 29/001* (2013.01); *G06F 3/165* (2013.01); *H04R 1/023* (2013.01)

(58) Field of Classification Search
CPC ....... H04R 29/001; H04R 1/023; G06F 3/165; B08B 7/02
See application file for complete search history.

(56) References Cited

U.S. PATENT DOCUMENTS

| 10,455,338 | B2 * | 10/2019 | Ouyang | ............... H04R 29/001 |
| 10,674,294 | B2 * | 6/2020 | Ouyang | ............... H04R 29/001 |
| 2006/0142998 | A1 | 6/2006 | Tseng et al. | |
| 2013/0287213 | A1 | 10/2013 | Sekiyama | |

(Continued)

FOREIGN PATENT DOCUMENTS

| CN | 103501375 A | 1/2014 |
| CN | 203446017 U | 2/2014 |

(Continued)

OTHER PUBLICATIONS

International search report, PCT/CN2018/075522, dated May 8, 2018 (3 pages).

(Continued)

*Primary Examiner* — Andrew L Sniezek

(57) ABSTRACT

A method and an apparatus for processing a sound hole of a speaker and a terminal device are disclosed. The method includes detecting whether the sound hole of the speaker is blocked, and prompting a user not to block the sound hole of the speaker by hands; and playing a built-in audio source file to drive a preset vibration device to vibrate according to a set vibration intensity to clear foreign matter blocking the sound hole of the speaker when the sound hole of the speaker is blocked.

19 Claims, 5 Drawing Sheets

(56) References Cited

U.S. PATENT DOCUMENTS

| | | | | |
|---|---|---|---|---|
| 2014/0168135 A1* | 6/2014 | Saukko | ............... | G06F 1/1684 |
| | | | | 345/174 |
| 2014/0376759 A1 | 12/2014 | Chang | | |
| 2015/0304786 A1* | 10/2015 | Partio | ............... | H04R 29/004 |
| | | | | 381/58 |
| 2017/0127163 A1* | 5/2017 | Weber | ................. | B05D 5/04 |

FOREIGN PATENT DOCUMENTS

| | | | |
|---|---|---|---|
| CN | 104345094 A | | 2/2015 |
| CN | 105049636 A | | 11/2015 |
| CN | 105149297 A | | 12/2015 |
| CN | 105915718 A | | 8/2016 |
| CN | 106878909 A | | 6/2017 |
| EP | 3001654 A1 | | 3/2016 |
| JP | 2011139310 A | * | 7/2011 |

OTHER PUBLICATIONS

First Office Action from China patent office in a counterpart Chinese Patent application No. 201710123610.4, dated Dec. 27, 2018 (7 pages).
Search report from Second Office Action from China patent office in a counterpart Chinese Patent application No. 201710123610.4, dated Apr. 11, 2019 (1 pages).
European search report, EP18760642, dated Jan. 28, 2020 (8 pages).

* cited by examiner

METHOD AND APPARATUS FOR PROCESSING SOUND HOLE OF SPEAKER AND ELECTRONIC DEVICE

CROSS-REFERENCE TO RELATED APPLICATION(S)

This application is a continuation of International Patent Application No. PCT/CN2018/075522, filed on Feb. 7, 2018, which claims priority to Chinese Patent Application No. 201710123610.4, filed on Mar. 3, 2017, the contents of both of which are herein incorporated by reference in their entireties.

TECHNICAL FIELD

The present disclosure generally relates to the field of terminal equipment, and in particular, to a method and an apparatus for processing a sound hole of a speaker, and a terminal device.

BACKGROUND

The speaker can increase volume of the output sound, which is almost a necessary component of a device such as a terminal device, MP4 etc. In order to ensure sound of the speaker is normally output from the device, the device usually defines a number of small holes in a direction of the sound hole of the speaker. Thus, it is inevitable that dust, liquid, etc. enter the device through the defined small holes and then the sound hole of the speaker is blocked.

SUMMARY

According to one aspect of the present disclosure, a method for processing a sound hole of a speaker is provided. The method includes detecting whether the sound hole of the speaker is blocked, and prompting a user not to block the sound hole of the speaker by hands; and playing a built-in audio source file to drive a preset vibration device to vibrate according to a set vibration intensity to clear foreign matter blocking the sound hole of the speaker when the sound hole of the speaker is blocked.

According to another aspect of the present disclosure, a terminal device is provided. The terminal device includes a speaker defining a sound hole, a vibration assembly disposed at a side of a sound channel of the speaker, a non-transitory memory storing executable program codes, and a processor. The processor is configured to perform the executable program codes to detect whether the sound hole is blocked; and play a built-in audio source file to drive the vibration assembly to vibrate according to a preset vibration intensity to clear foreign matter blocking the sound hole when the sound hole is blocked.

According to yet another aspect of the present disclosure, a non-transitory storage medium is provided. The non-transitory storage medium stores a computer program, when executed, causing a processor to detect whether a sound hole is blocked, and prompt a user not to block the sound hole by hands; and play a built-in audio source file to drive a preset vibration device to vibrate according to a preset vibration intensity to clear foreign matter blocking the sound hole when the sound hole is blocked.

BRIEF DESCRIPTION OF DRAWINGS

The above and/or additional aspects and advantages of the present disclosure will become apparent and be easily understood from the description for embodiments in connection with the following figures, wherein.

DETAILED DESCRIPTION

Figure 1:
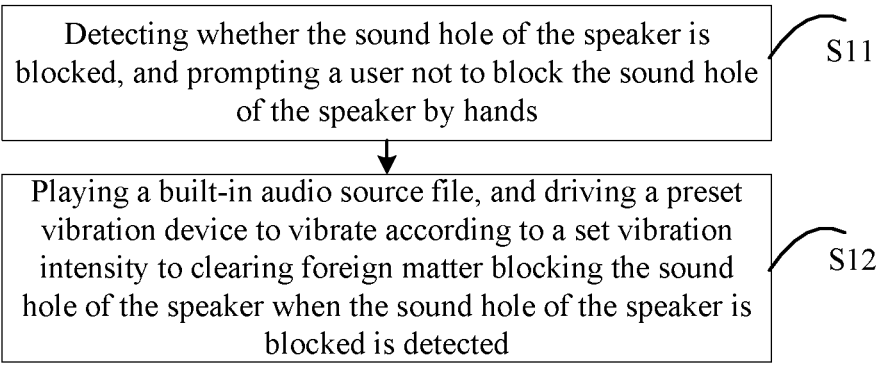
FIG. 1 is a flow chart of a method for processing a sound hole of a speaker according to an embodiment of the present disclosure.

Embodiments of the present disclosure will be described in detail below, examples of which are shown in the accompanying figures, in which the same or similar reference numerals have been used throughout to denote the same or similar elements or elements serving the same or similar functions. The embodiments described below with reference to the accompanying figures are exemplary only, meaning they are intended to be illustrative, rather than limiting the present disclosure.

A method and an apparatus for processing a sound hole of a speaker and a terminal device according to an embodiment of the present disclosure are described below with reference to the accompanying drawings.

Currently, a sound hole is usually defined at a location on a housing of a mobile terminal corresponding to a speaker, so that the sound is released through the sound hole. The sound hole exists for allowing dust, liquid, etc. to enter the mobile terminal, which in turn causes the sound hole of the speaker become blocked. In the related art, in order to prevent dust, liquid, etc. from entering the interior of the single speaker of the mobile terminal to affect outputting sound of the speaker, a dustproof net is usually attached to a sound channel of the speaker, and the dustproof net has a hole diameter of about 30 micrometers. Dust, liquid, etc. is prevented from entering the interior of the single speaker through the dustproof net.

However, dust, liquid, and the like are easy to deposit on the dustproof net while the dustproof net prevents dust, liquid, and the like from entering the interior of the speaker. As dust, liquid, etc. accumulate on the dustproof net, an area of the sound hole of the speaker is continuously reduced, which causes the volume of the sound output from the speaker become decreased or the output sound mixed with noise.

In view of the above problems, the present disclosure provides a method for processing a sound hole of a speaker, which can automatically clear dust or debris on the dustproof net without disassembling the whole device when the dustproof net is blocked by dust, liquid, or the like.

A method for processing a sound hole of a speaker is provided. The method includes detecting whether the sound hole of the speaker is blocked, and prompting a user not to block the sound hole of the speaker by hands; and playing a built-in audio source file to drive a preset vibration device to vibrate according to a preset vibration intensity to clear foreign matter blocking the sound hole of the speaker when the sound hole of the speaker is blocked.

In one embodiment, before detecting whether the sound hole of the speaker is blocked, the method further includes providing a fault detection interface to the user wherein the fault detection interface comprises a function key for sound hole detection; and receiving the user's clicks on the function key for sound hole detection in the fault detection interface.

In one embodiment, the detecting whether the sound hole of the speaker is blocked includes obtaining a real-time impedance value of the speaker, and determining whether the sound hole of the speaker is blocked according to the real-time impedance value.

In one embodiment, before the playing the built-in audio source file, the method further includes determining whether to clear the sound hole of the speaker by text or voice.

In one embodiment, the preset vibration intensity is increased during the playing built-in audio source file. In one embodiment, the preset vibration intensity is increased at an interval during the playing built-in audio source file.

In another embodiment, the preset vibration intensity is constant during the playing built-in audio source file.

In one embodiment, the vibration device comprises a vibration motor, or a micro-motor system. In one embodiment, the preset vibration device is disposed at a side of a sound channel of the speaker.

In one embodiment, after the clearing the foreign matter blocking the sound hole of the speaker, the method further includes reperforming the detecting whether the sound hole of the speaker is blocked and the prompting the user not to block the sound hole of the speaker by hands after a preset time period; and prompting the user to repair when the sound hole of the speaker continues to be blocked. In one embodiment, the preset time period is not less than a playing duration of the built-in audio source file.

In one embodiment, the method further includes prompting the user to make the sound hole face downward when the sound hole of the speaker is blocked.

A terminal device is provided. The terminal device includes a speaker defining a sound hole, a vibration assembly disposed at a side of a sound channel of the speaker, a non-transitory memory storing executable program codes, and a processor. The processor is configured to perform the executable program codes to detect whether the sound hole is blocked; and play a built-in audio source file to drive the vibration assembly to vibrate according to a preset vibration intensity to clear foreign matter blocking the sound hole when the sound hole is blocked.

In one embodiment, the vibration assembly comprises a vibration motor or a micro-motor system.

In one embodiment, the terminal device further includes a dustproof net attached to the sound channel of the speaker.

In one embodiment, the detecting whether the sound hole is blocked includes obtaining a real-time impedance value of the speaker; and determining whether the sound hole is blocked according to the real-time impedance value.

In one embodiment, the processor further determines whether to clear the sound hole by text or voice before the playing the built-in audio source file.

In one embodiment, the preset vibration intensity is increased during the playing built-in audio source file.

In one embodiment, the preset vibration intensity is constant during the playing built-in audio source file.

A non-transitory storage medium is provided. The non-transitory storage medium stores a computer program, when executed, causing a processor to detect whether a sound hole is blocked, and prompt a user not to block the sound hole by hands; and play a built-in audio source file to drive a preset vibration device to vibrate according to a preset vibration intensity to clear foreign matter blocking the sound hole when the sound hole is blocked.

FIG. 1 is a flow chart of a method for processing a sound hole of a speaker according to an embodiment of the present disclosure. The method for processing the sound hole of the speaker in an embodiment of the present disclosure can be applied to various devices or terminal devices, such as a tablet computer, a notebook computer, a personal computer, a smart phone, etc., and can used for a user's own fault detection and processing and for a maintenance personnel's own fault detection and processing. In the following, an example, in which the method is used for user's own fault detection and processing, will be described.

As shown in FIG. 1, the method for processing the sound hole of the speaker includes actions/operations in the following blocks.

At block S11, the method detects whether the sound hole of the speaker is blocked, and prompts the user not to block the sound hole of the speaker by hands.

In an embodiment of the present disclosure, when the user uses a terminal device to perform a voice call, a video chat, or play music, if the user feels that the sound emitted by the terminal device is weak, and even the volume of a sound controller such as a media volume and a call volume of the terminal device is set to be maximum, the user feels that the volume of the sound is still weak, in this case, the user may guess that the sound hole of the speaker of the terminal device may be blocked.

In order to verify that the guess is correct, the user can activate a detection program in the terminal device to detect whether the sound hole of the speaker is blocked.

In addition, in order to ensure accuracy of the detection results, the terminal device can be used to remind the user not to block the sound hole of the speaker by hands, before the detection program is performed. For example, after the user starts the detection program in the terminal device, a pop-up window automatically appears on the display screen of the terminal device, the content of which is "Please do not block the sound hole by hands!".

It should be noted that, different methods can be used to detect whether the sound hole of the speaker is blocked in different application scenarios. As a possible implementation, a real-time impedance value of the speaker can be detected to determine whether the sound hole of the speaker is blocked, based on the principle that the blocked sound hole affects an impedance curve of the speaker.

At block S12, a built-in audio source file is played, and a preset vibration device is driven to vibrate according to a set vibration intensity to clear foreign matter blocking the sound hole of the speaker when it is detected that the sound hole of the speaker is blocked.

The vibration device may be a vibration motor, a micro motor system, or other electronic components or devices capable of generating vibration. In practical applications, the number of vibration devices and the installation position of the vibration devices may also be different in different application scenarios, which is not restricted in the present disclosure.

Specifically, in an embodiment of the present disclosure, if it is detected that the sound hole of the speaker is blocked, the preset vibration device can be driven to vibrate according to a set vibration intensity by playing the built-in audio source file, and then the dustproof net on the sound channel of the speaker is vibrated as the preset vibration device is vibrated, to achieve the purpose of clearing the foreign matter which blocks the sound hole of the speaker. In an embodiment of the present disclosure, the user is prompted to make the sound hole face downward when the sound hole of the speaker is blocked. Thus, when the preset vibration device is driven to vibrate according to the set vibration intensity by playing the built-in audio source file, the foreign matter which blocks the sound hole can be cleared more clearly.

In order to describe more clearly, an implantation process, in which the preset vibration device is driven to vibrate according to the set vibration intensity to clear the foreign matter which blocks the sound hole of the speaker, is described below in conjunction with a schematic diagram of the speaker and the vibration devices.

Figure 2:
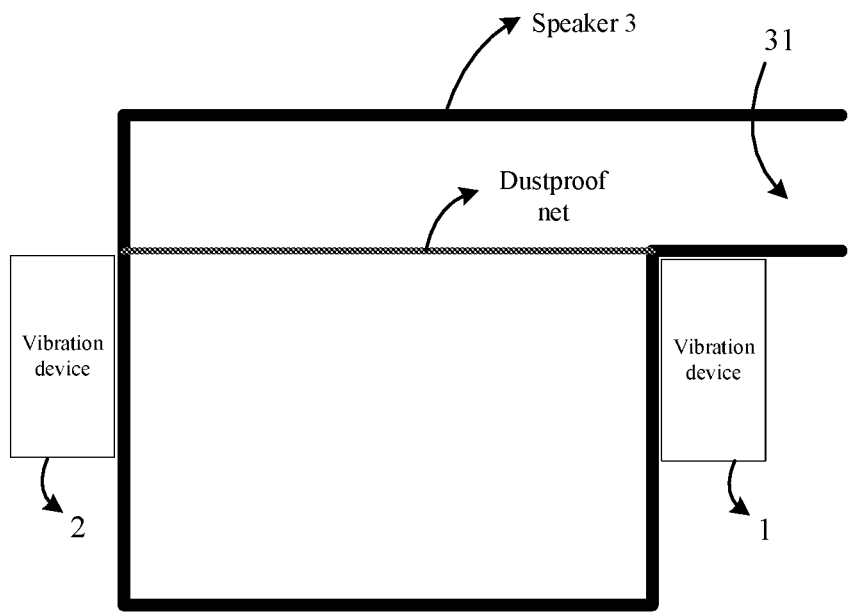
FIG. 2 is a schematic diagram of a simple design of a speaker and vibration devices.

FIG. 2 is a diagram of a simple design of the speaker and the vibration devices. As shown in FIG. 2, a dustproof net is attached to the sound channel of the speaker 3 to prevent dust, liquid, etc. from entering the inside of the speaker, a sound hole 31 is defined at one end of the sound channel, and a vibration device 1 and a vibration device 2 are respectively installed on the outer sides of the sound channel of the speaker. The dustproof net is vibrated as the vibration device 1 and the vibration device 2 are vibrated, causing the foreign matter which blocks the dustproof net to fall.

Alternatively, in some embodiments of the present disclosure, when it is detected that the sound hole of the speaker is blocked, in order to avoid secondary damage to the terminal device in some application scenarios where the preset vibration device is directly driven to vibrate according to the set vibration intensity by playing the built-in audio source file, the user may be asked whether to clear the sound hole of the speaker through a pop-up window or the like, so that the user can decide whether the vibration devices are vibrated according to the specific state of the terminal device.

For example, "Clear the sound hole of the speaker?" is displayed in the pop-up window, and two selection keys, which are "Yes" and "No" provided for the user to select, are set below the text displayed in the pop-up window. When the user clicks "Yes", the pop-up window disappears, and the audio source file built in the terminal device is played to drive the preset vibration device to vibrate according to the set vibration intensity. When the user selects "No", "Please send to the service center to repair!" is displayed in the pop-up window. The flexibility can be improved by asking the user whether to clear the sound hole of the speaker.

Of course, in the actual operation process, the user can also be asked whether to clear the sound hole of the speaker in other ways such as voice inquiry, which is not limited herein.

More specifically, in an embodiment of the present disclosure, the above-mentioned set vibration intensity is diverse. For example, the vibration intensity of the vibration device driven when the built-in audio source file is played can be set to be constant. For another example, the vibration intensity of the vibration device driven when the built-in audio source file is played is set to be increased according to the play time. These two different examples will be described in detail below.

Example 1: the vibration intensity of the vibration device driven when the built-in audio source file is played is constant.

In this example, the vibration intensity of the vibration device driven when the built-in audio source file is played is set to be constant. Thus, when the vibration device is driven by playing the audio source file, the vibration intensity of the vibration device remains unchanged during the playback of the audio source file. For example, suppose that the vibration intensity of the vibration device driven when the built-in audio source file is played is set to 0.45 mm/s. When it is detected that the sound hole of the speaker of the terminal device is blocked, the vibration device is driven by playing the built-in audio source file, and the vibration intensity of the vibration device is always 0.45 mm/s during the playback of the audio source file.

Example 2: the vibration intensity of the vibration device driven when the built-in audio source file is played is increased according to the play time.

In this example, the vibration intensity of the vibration device driven when the built-in audio source file is played is set to be increased according to the play time. Thus, when the vibration device is driven by playing the audio source file, the vibration intensity of the vibration device is increased as the play time goes during the playback of the audio source file.

For example, suppose that the playback time period of the built-in audio source file is 60 seconds, the vibration intensity of the vibration device driven during the first 20 seconds is set to 0.45 mm/s, and the vibration intensity of the vibration device driven during a time period from 21th second to 40th second is set to 0.71 mm/s, the vibration intensity of the vibration device driven during a time period from 41th second to 60th second is set to the maximum vibration intensity value of the vibration device, i.e. 1 mm/s. When it is detected that the sound hole of the speaker of the terminal device is blocked, the preset vibration device is driven to vibrate according to the increased vibration intensity by playing the built-in audio source file at different time periods. The vibration device is vibrated according to the vibration intensity of 0.45 mm/s during the first 20 seconds, according to the vibration intensity of 0.71 mm/s during the time period from 21th second to 40th second, and according to the vibration intensity of 1 mm/s during the time period from 41th second to 60th second.

Of course, in actual applications, the implementations of the vibration intensity in the above two examples may be used alone or in combination as needed. For example, when the vibration device with the fixed vibration intensity in the example 1 is used to clear the sound hole, in order to clear the foreign matter on the dustproof net and avoid a problem that constant vibration intensity cannot clear stubborn matters. The way in the example 2 can also be used to clear matter, which is that the vibration intensity of the vibration device driven when the built-in audio source file is played is increased according to the play time. Thus, when the built-in audio source file is played, the preset vibration device can be driven to vibrate according to the increased vibration intensity at different time periods, so that the foreign matter is cleared more clearly.

In the method for processing the sound hole of the speaker in the embodiments of the present disclosure, in a case where it is detected that the sound hole of the speaker is blocked, by playing the built-in audio source file, the preset vibration device is driven to vibrate according to the set vibration intensity, and the foreign matter blocking the sound hole of the speaker is cleared. Therefore, when the dustproof net is blocked with dust, liquid, or the like, automatic clearing of dust or debris on the dustproof net can be realized without disassembling the whole device, which reduces the processing difficulty and improves the user's experience.

Based on the above embodiments, in order to facilitate the user to know the clearing result of the blocked sound hole in real time, so that the user can take corresponding treatment measures according to the clearing result to ensure that the sound hole of the speaker is cleared more thoroughly. After the vibration device is driven to vibrate to clear the foreign matter blocking the sound hole of the speaker by playing the built-in audio source file, the result may be further detected.

Figure 3:
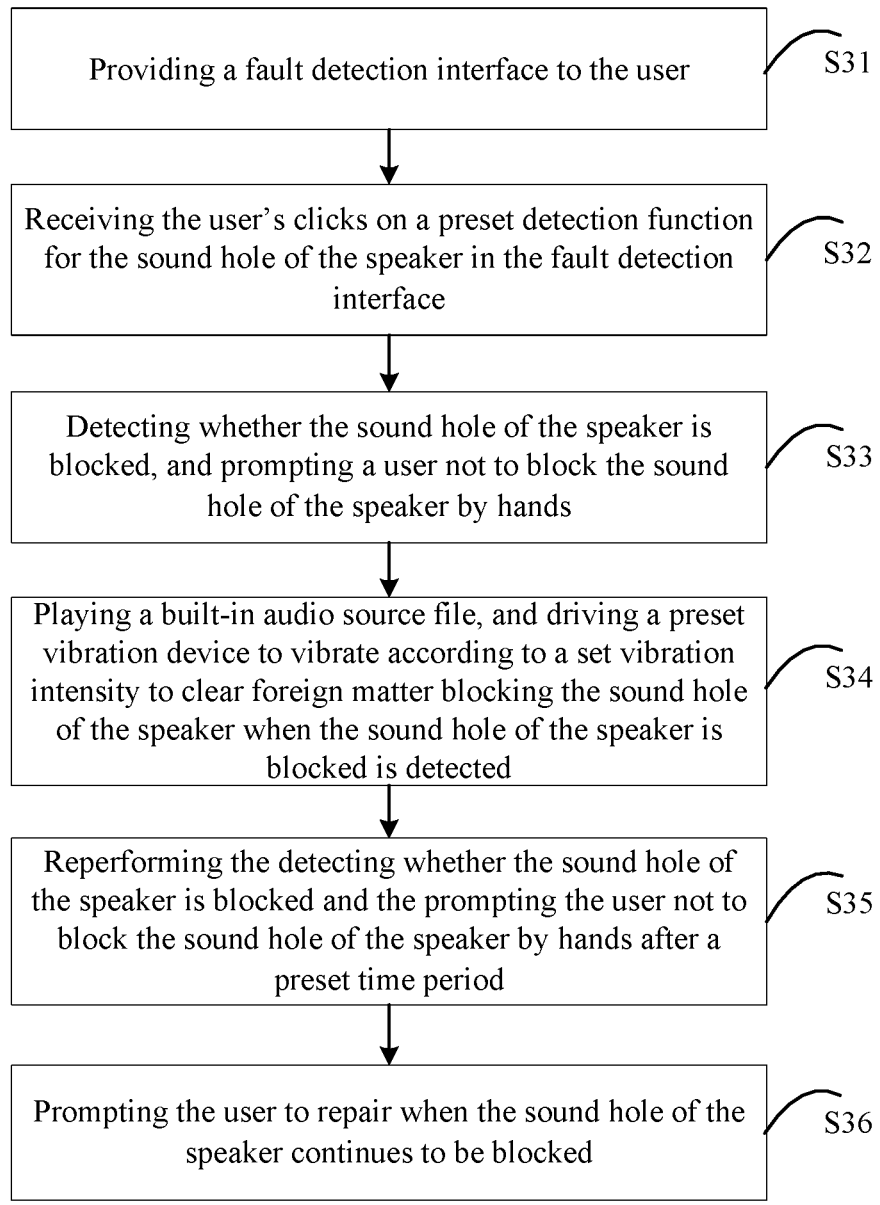
FIG. 3 is a flow chart of a method for processing a sound hole of a speaker according to another embodiment of the present disclosure.

Specifically, FIG. 3 is a flowchart of a method for processing a sound hole of a speaker according to another embodiment of the present disclosure.

As shown in FIG. 3, the method for processing a sound hole of a speaker may include actions/operations in the following blocks.

At block S31, the method provides a fault detection interface to the user through the terminal device.

In the embodiment of the present disclosure, in order to facilitate the user to detect whether the terminal device has a fault, the terminal device may provide the fault detection interface to the user. The fault detection interface includes a detection function for the sound hole of the speaker and other functions set therein.

When the user uses the terminal device to make a voice call, a video chat, or play music, if the user feels that the sound emitted by the terminal device is weak, and even if the volume of a volume controller, such as a media volume and a call volume of the terminal device, is set to be maximum, the volume that the user feels is still weak, in this case, the user may guess that the sound hole of the speaker of the terminal device may be blocked. At this point, the user can enter the fault detection interface in the terminal device and select the detection function for the sound hole of the speaker in the fault detection interface.

At block S32, the method receives the user's clicks on the preset detection function for the sound hole of the speaker in the fault detection interface.

In an embodiment of the present disclosure, the user can select a corresponding function by clicking a function key in the fault detection interface. When the user clicks the preset detection function for the sound hole of the speaker in the fault detection interface, the terminal device receives the user's click operation on the detection function for the sound hole of the speaker.

Alternatively, in order to improve the flexibility of the method and avoid the erroneous operation, in some embodiments of the present disclosure, after the user clicks the preset detection function for the sound hole of the speaker in the fault detection interface, the user is further asked whether to detect the sound hole of the speaker through the popup window. Two selection keys, which are "Yes" and "No", are provided. When the user selects "Yes", the terminal device receives the user's clicks on the detection function for the sound hole of the speaker, and when the user selects "No", the fault detection interface is displayed.

At block S33, the method detects whether the sound hole of the speaker is blocked and prompts the user not to block the sound hole of the speaker by hands.

In the embodiment of the present disclosure, after the terminal device receives the click operation of the preset detection function for the sound hole of the speaker in the fault detection interface, a detecting program in the terminal device may be triggered to detect whether the sound hole of the speaker is blocked.

At block S34, a built-in audio source file is played, and the preset vibration device is driven to vibrate according to the set vibration intensity, and then the foreign matter blocking the sound hole of the speaker is cleared, when it is detected that the sound hole of the speaker is blocked.

It should be noted that, the description of the blocks S33-S34 in the present disclosure may refer to the foregoing description of the blocks S11-S12, and the implementation principles thereof are similar, which are not described herein again.

At block S35, the method reperforms the detecting whether the sound hole of the speaker is blocked and the prompting the user not to block the sound hole of the speaker by hands after a preset time period.

The preset time period may be set by the manufacturer before leaving the factory, or may be set by the user after leaving the factory. The specific value of the preset time period may be the playable duration of the built-in audio source file, or may be less than or longer than the playable duration, which is not limited herein. However, in order to ensure the clearing effect, the specific duration of the preset time period is generally set to be not less than the playable duration of the built-in audio source file.

In the embodiment of the present disclosure, in order to detect whether the sound hole of the speaker is cleared clearly, it is possible to reperform detecting whether the sound hole of the speaker is blocked after the preset time period.

In order to ensure the accuracy of the detection results, the terminal device can be used to remind the user not to block the sound hole of the speaker by hands before detecting. For example, after the user starts the detection program in the terminal device, a pop-up window automatically appears on the display screen of the terminal device, and the content of the pop-up window is displayed as "Please do not block the sound hole of the speaker by hands!".

At block S36, the user is prompted to repair when it is detected that the sound hole of the speaker continues to be blocked.

In the embodiment of the present disclosure, if the result of the re-detection is that the sound hole of the speaker is still blocked, the terminal device can remind the user to repair. For example, the user can be reminded by a pop-up window, in which "The sound hole of the speaker is blocked, please send it to the service center for repair!" is displayed so as to remind the user to repair the terminal device as soon as possible.

In the method for processing the sound hole of the speaker of the embodiment of the present disclosure, the fault detection interface is provided for the user through the terminal device, and the user's clicks on the preset detection function of the sound hole of the speaker in the fault detection interface, which is convenient for the user to enter the detection function of the sound hole of the speaker. The user is prompted not to block the sound hole of the speaker by hands, which can improve detection accuracy. When it is detected that the sound hole of the speaker is blocked, the built-in audio source file is played to drive the preset vibration device to vibrate according to the set vibration intensity, such that the foreign matter blocking the sound hole of the speaker is cleared, which automatically clears the sound hole of the speaker without disassembling the terminal device and then improves the user's experience. The sound hole of the speaker is re-detected after the preset time period, and when it is detected the sound hole of the speaker continues to be blocked, the user is prompted to repair, which can detect the clearing effect and remind the user to perform maintenance when necessary to improve the user's experience.

Figure 4:
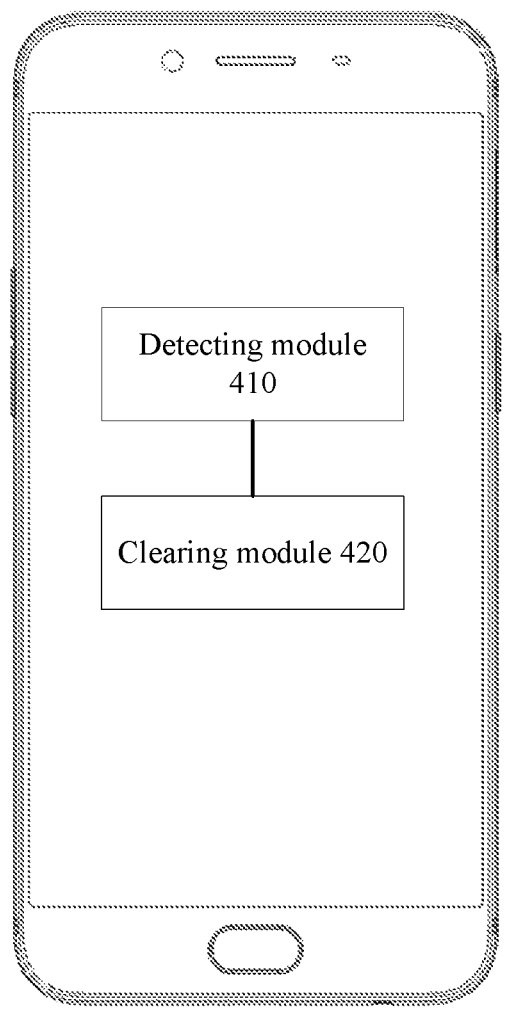
FIG. 4 is a schematic diagram of an apparatus for processing a sound hole of a speaker according to an embodiment of the present disclosure.

In order to implement the above embodiments, an apparatus for processing a sound hole of the speaker is also provided. FIG. 4 is a schematic diagram of an apparatus for processing a sound hole of the speaker according to an embodiment of the present disclosure.

As shown in FIG. 4, the apparatus for processing a sound hole of the speaker includes a detecting module 410 and a clearing module 420.

The detecting module 410 is configured to detect whether the sound hole of the speaker is blocked and prompt the user not to block the sound hole of the speaker by hands.

Alternatively, in some embodiments of the present disclosure, the detecting module 410 is further configured to detect whether the sound hole of the speaker is blocked and prompt the user not to block the sound hole of the speaker by hands after the preset time period. Thus, the clearing effect on the sound hole of the speaker is detected at a time interval.

It should be noted that, different methods can be used to detect whether the sound hole of the speaker is blocked in different application scenarios. As a possible implementation, a real-time impedance value of the speaker can be detected to determine whether the sound hole of the speaker is blocked, based on the principle that the blocked sound hole affects an impedance curve of the speaker.

The clearing module 420 is configured to play the built-in audio source file, drive the preset vibration device to vibrate according to the set vibration intensity, and clear the foreign matter blocking the sound hole of the speaker when detecting the sound hole of the speaker is blocked.

The vibration device may be a vibration motor, a micro motor system, or other electronic components or devices capable of generating vibration. In practical applications, the number of vibration devices and the installation position of the vibration devices may also be different in different application scenarios, which is not restricted in the present disclosure. Alternatively, the clearing module 420 is further configured to play the built-in audio source file and drive the preset vibration device to vibrate according to the increased vibration intensity at different time periods when detecting that the sound hole of the speaker is blocked.

Alternatively, the clearing module 420 is further configured to play the built-in audio source file and drive the preset vibration device to vibrate according to a constant vibration intensity when detecting that the sound hole of the speaker is blocked. It should be noted that the foregoing explanation of the embodiment of the method for processing the sound hole of the speaker is also applicable to the apparatus for processing the sound hole of the speaker of the present embodiment, of which the implementation principle is similar and are not described herein again.

In the apparatus for processing the sound hole of the speaker of the embodiment of the present disclosure, in a case where it is detected that the sound hole of the speaker is blocked, by playing the built-in audio source file, the preset vibration device is driven to vibrate according to the set vibration intensity, and then foreign matter which blocks the sound hole of the speaker is cleared. Therefore, when the dustproof net is blocked with dust, liquid, or the like, automatic clearing of dust or debris on the dustproof net can be realized without disassembling the whole device, which reduces the processing difficulty and improves the user's experience.

Figure 5:
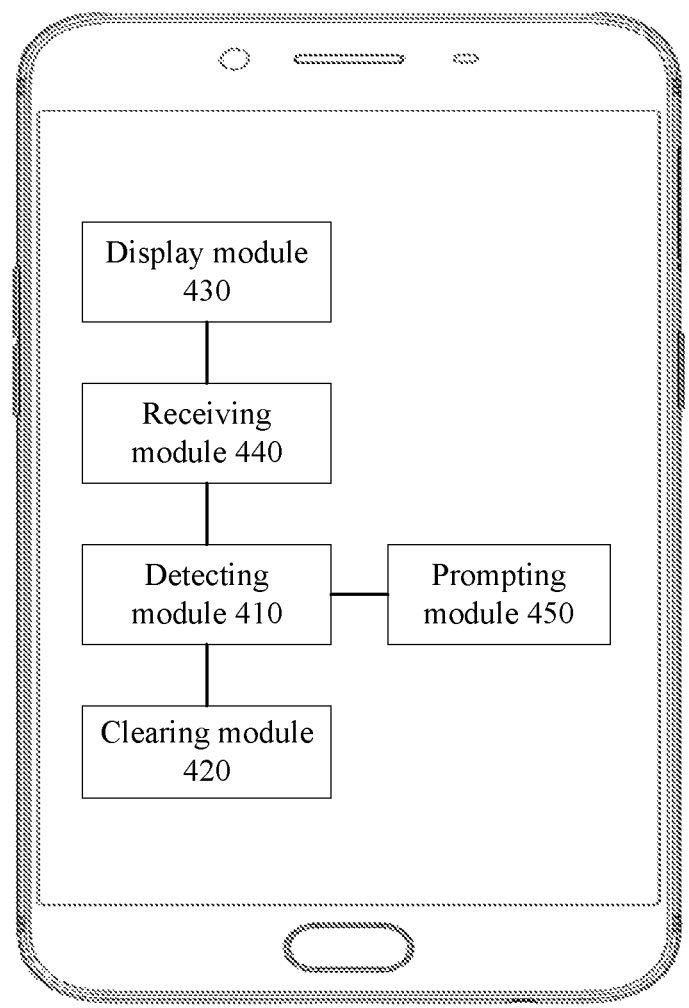
FIG. 5 is a schematic diagram of an apparatus for processing a sound hole of a speaker according to another embodiment of the present disclosure.

FIG. 5 is a schematic diagram of an apparatus for processing the sound hole of the speaker according to another embodiment of the present disclosure.

As shown in FIG. 5, based on what is shown in FIG. 4, the apparatus for processing the sound hole of the speaker may further include the following.

The display module 430 is configured to provide a fault detection interface to the user.

The receiving module 440 is configured to receive the user's clicks on a preset detection function for the sound hole of the speaker in the fault detection interface.

The prompting module 450 is configured to prompt the user to repair when detecting that the sound hole of the speaker continues to be blocked.

It should be noted that the foregoing explanation in the embodiments of the method for processing the sound hole of the speaker is also applicable to the apparatus for processing the sound hole of the speaker in the present embodiment, and the implementation principle thereof is similar, which are not described herein again.

In the apparatus for processing the sound hole of the speaker in the embodiments of the present disclosure, the fault detection interface is provided for the user through the terminal device, and the user's clicks on the preset detection function of the sound hole of the speaker in the fault detection interface, which is convenient for the user to enter the detection function of the sound hole of the speaker. The user is prompted not to block the sound hole of the speaker by hands, which can improve detection accuracy. When it is detected that the sound hole of the speaker is blocked, the built-in audio source file is played to drive the preset vibration device to vibrate according to the set vibration intensity, such that the foreign matter blocking the sound hole of the speaker is cleared, which automatically clears the sound hole of the speaker without disassembling the terminal device and then improves the user's experience. The sound hole of the speaker is re-detected after the preset time period, and when it is detected the sound hole of the speaker continues to be blocked, the user is prompted to repair, which can detect the clearing effect and remind the user to perform maintenance when necessary to improve the user's experience.

Figure 6:
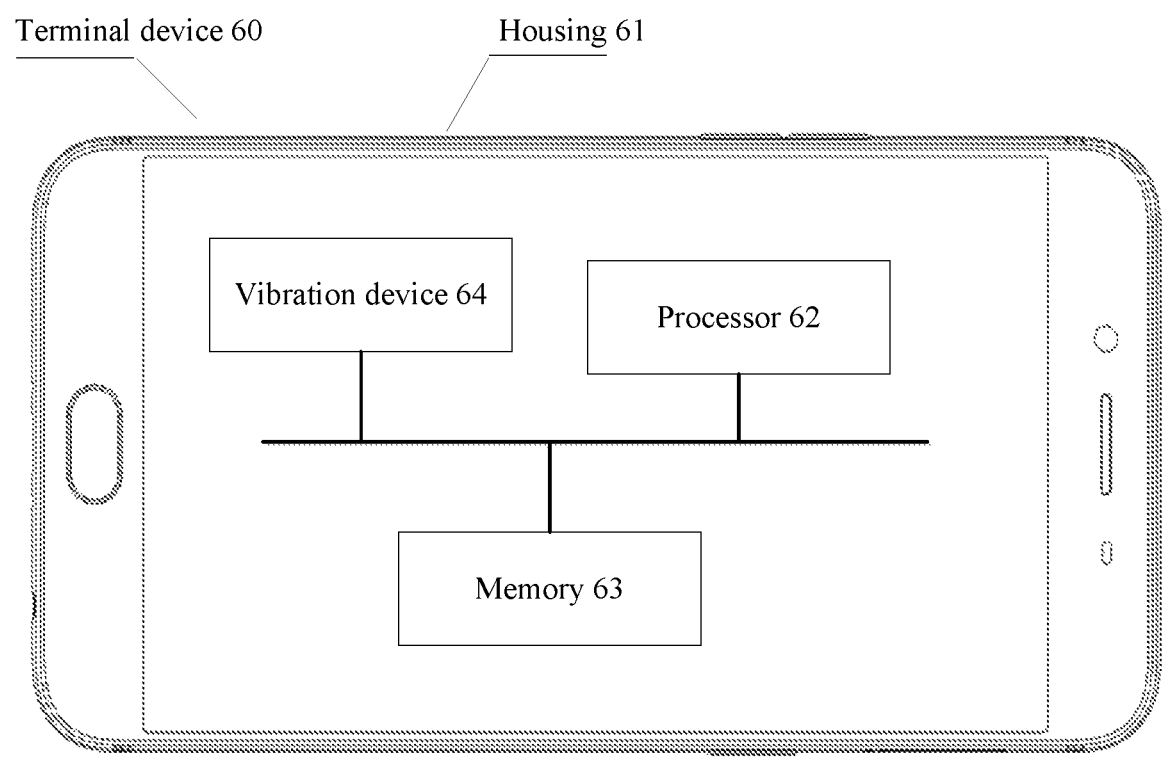
FIG. 6 is schematic diagram of a terminal device according to an embodiment of the present disclosure.

In order to implement the above embodiments, a terminal device is also provided. FIG. 6 is schematic diagram of a terminal device according to an embodiment of the present disclosure.

As shown in FIG. 6, the terminal device 60 includes one or more of the following components: a housing 61 and a processor 62, a memory 63, and a vibration device 64 in the housing 61. The processor 62 reads executable program codes stored in the memory 63 to execute a program corresponding to the executable program codes for performing the following actions.

Detecting whether the sound hole of the speaker is blocked, and prompting the user not to block the sound hole of the speaker by hands;

Playing the built-in audio source file, driving the preset vibration device 64 to vibrate according to the set vibration intensity, and clearing the foreign matter blocking the sound hole of the speaker when it is detected that the sound hole of the speaker is blocked.

It should be noted that the foregoing description of the embodiments of the method for processing the sound hole of the speaker is also applicable to the apparatus for processing the sound hole of the speaker of the present embodiment, of which the implementation principle is similar and which are not described herein again.

In the terminal device of the embodiment of the present disclosure, in a case where it is detected that the sound hole of the speaker is blocked, by playing the built-in audio source file, the preset vibration device is driven to vibrate according to the set vibration intensity, and then foreign matter blocking the sound hole of the speaker is cleared.

Therefore, when the dustproof net is blocked with dust, liquid, or the like, automatic clearing of dust or debris on the dustproof net can be realized without disassembling the whole device, which reduces the processing difficulty and improves the user's experience.

In order to implement the above embodiments, a non-transitory computer readable storage medium is also provided. When instructions in the storage medium are executed by a processor of the terminal device, the terminal device is caused to perform the method for processing the sound hole of the speaker in the first aspect of the present disclosure.

In the non-transitory computer readable storage medium of the embodiment of the present disclosure, in a case where it is detected that the sound hole of the speaker is blocked, by playing the built-in audio source file, the preset vibration device is driven to vibrate according to the set vibration intensity, and then foreign matter blocking the sound hole of the speaker is cleared. Therefore, when the dustproof net is blocked with dust, liquid, or the like, automatic clearing of dust or debris on the dustproof net can be realized without disassembling the whole device, which reduces the processing difficulty and improves the user's experience.

In order to implement the above embodiments, a computer program product is also provided. When instructions in the computer program product are executed by a processor, the method for processing the sound hole of the speaker in the first aspect of the present disclosure is performed.

In the computer program product of the embodiment of the present disclosure, in a case where it is detected that the sound hole of the speaker is blocked, by playing the built-in audio source file, the preset vibration device is driven to vibrate according to the set vibration intensity, and then foreign matter blocking the sound hole of the speaker is cleared. Therefore, when the dustproof net is blocked with dust, liquid, or the like, automatic clearing of dust or debris on the dustproof net can be realized without disassembling the whole device, which reduces the processing difficulty and improves the user's experience.

Reference throughout this specification, the reference terms "an embodiment", "some embodiments", "an example", "a specific example", or "some examples", and the like means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples. In addition, one skilled in the art may combine the different embodiments or examples described in this specification and features of different embodiments or examples without conflicting with each other.

In addition, terms such as "first", "second", and the like are used herein for purposes of description, and are not intended to indicate or imply relative importance or significance or to imply the number of indicated technical features. Thus, the feature defined with "first", "second", and the like may include one or more of such a feature. In the description of the present disclosure, "a plurality of" means two or more, such as two, three, and the like, unless specified otherwise.

Any process or method description in the flowcharts or otherwise described herein may be understood to represent a module, segment or portion of code that includes one or more executable instructions for implementing the steps of a particular logical function or process. And the scope of the preferred embodiments of the present disclosure includes additional implementations, in which the involved functions may be performed in a substantially simultaneous manner or in the reverse order, instead of the illustrated or discussed order. It will be understood by those skilled in the art to which the embodiments of the present disclosure pertain.

The logic and/or steps represented in the flowchart or otherwise described herein, for example, may be considered as an ordered list of executable instructions for implementing logical functions and may be embodied in any computer readable medium, which is provided for an instruction execution system, apparatus, or device (e.g., a computer-based system, a system including a processor, or other system that can fetch instructions and execute instructions from an instruction execution system, apparatus, or device), or a combination thereof. For the purposes of this specification, a "computer-readable medium" can be any apparatus that can contain, store, communicate, propagate, or transport a program for use in an instruction execution system, apparatus, or device, or a combination thereof. More specific examples (non-exhaustive list) of computer readable media include: electrical connections (electronic devices) having one or more wires, portable computer disk cartridges (magnetic devices), random access memory (RAM), Read only memory (ROM), erasable editable read only memory (EPROM or flash memory), fiber optic devices, and portable compact disk read only memory (CDROM). In addition, the computer readable medium may even be a paper or other suitable medium on which the program can be printed, because it may be optically scanned, for example, by paper or other medium, be edited, interpreted, or processed in other suitable manner to obtain the program electronically and then stored in a computer memory.

It should be understood that portions of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, as in another embodiment, it can be implemented by any one or combination of the following techniques well known in the art: discrete logic circuits having logic gates for implementing logic functions on data signals, application specific integrated circuits with suitable combinational logic gates, programmable gate arrays (PGAs), field programmable gate arrays (FPGAs), etc.

One of ordinary skill in the art can understand that all or part of the steps carried by the method in the above embodiments can be completed by a program to instruct related hardware, and the program can be stored in a computer readable storage medium. When executed, one or a combination of the steps of the method embodiments is included.

In addition, each functional unit in each embodiment of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as stand-alone products, may also be stored in a computer readable storage medium.

The above-mentioned storage medium may be a read only memory, a magnetic disk, or an optical disk. While the embodiments of the present disclosure have been shown and described above, it is understood that the above-described embodiments are illustrative and are not to be construed as limiting the scope of the present disclosure. The embodiments are subject to variations, modifications, substitutions and variations by the skilled in the art within the scope of the present disclosure.

What is claimed is:

1. A method for processing a sound hole of a speaker, comprising:
    detecting whether the sound hole of the speaker is blocked, and prompting a user not to block the sound hole of the speaker by hands;
    playing a built-in audio source file to drive a preset vibration device to vibrate the sound hole according to a preset vibration intensity to clear foreign matter blocking the sound hole of the speaker when the sound hole of the speaker is blocked; and
    after the clearing the foreign matter blocking the sound hole of the speaker:
        reperforming the detecting whether the sound hole of the speaker is blocked and the prompting the user not to block the sound hole of the speaker by hands after a preset time period; and
        prompting the user to repair the sound hole when the sound hole of the speaker continues to be blocked.

2. The method of claim 1, further comprising:
    before detecting whether the sound hole of the speaker is blocked:
    providing a fault detection interface to the user wherein the fault detection interface comprises a function key for sound hole detection of whether the sound hole of the speaker is blocked; and
    receiving clicks associated with the user on the function key for sound hole detection in the fault detection interface.

3. The method of claim 1, wherein the detecting whether the sound hole of the speaker is blocked comprises:
    obtaining a real-time impedance value of the speaker, and
    determining whether the sound hole of the speaker is blocked according to the real-time impedance value.

4. The method of claim 1, further comprising:
    before the playing the built-in audio source file, determining by a text or voice command whether to clear the sound hole of the speaker.

5. The method of claim 1, wherein the preset vibration intensity is increased during the playing built-in audio source file.

6. The method of claim 5, wherein the preset vibration intensity is increased at an interval during the playing built-in audio source file.

7. The method of claim 1, wherein the preset vibration intensity is constant during the playing built-in audio source file.

8. The method of claim 1, wherein the vibration device comprises a vibration motor, or a micro-motor system.

9. The method of claim 8, wherein the preset vibration device is disposed at a side of a sound channel of the speaker.

10. The method of claim 1, wherein the preset time period is not less than a playing duration of the built-in audio source file.

11. The method of claim 1, further comprising:
    prompting the user to make the sound hole face downward when the sound hole of the speaker is blocked.

12. An electronic device, comprising:
    a speaker defining a sound hole;
    a vibration assembly disposed at a side of a sound channel of the speaker;
    a non-transitory memory storing executable program codes; and
    a processor configured to perform the executable program codes to:
        detect whether the sound hole is blocked;
        play a built-in audio source file to drive the vibration assembly to vibrate the sound hole according to a preset vibration intensity to clear foreign matter blocking the sound hole when the sound hole is blocked;
        reperform detecting whether the sound hole of the speaker is blocked and prompt a user not to block the sound hole of the speaker by hands after a preset time period; and
        prompt the user to repair the sound hole when the sound hole of the speaker continues to be blocked.

13. The electronic device of claim 12, wherein the vibration assembly comprises a vibration motor or a micro-motor system.

14. The electronic device of claim 12, further comprising:
    a dustproof net attached to the sound channel of the speaker.

15. The electronic device of claim 12, wherein the detecting whether the sound hole is blocked comprises:
    obtaining a real-time impedance value of the speaker; and
    determining whether the sound hole is blocked according to the real-time impedance value.

16. The electronic device of claim 12, wherein the processor further determines whether to clear the sound hole by a text or voice command before the playing the built-in audio source file.

17. The electronic device of claim 12, wherein the preset vibration intensity is increased during the playing built-in audio source file.

18. The electronic device of claim 12, wherein the preset vibration intensity is constant during the playing built-in audio source file.

19. A non-transitory storage medium storing a computer program, when executed, causing a processor to:
    detect whether a sound hole of a speaker is blocked, and prompt a user not to block the sound hole by hands; and
    play a built-in audio source file to drive a preset vibration device to vibrate the sound hole according to a preset vibration intensity to clear foreign matter blocking the sound hole when the sound hole is blocked;
    reperform detecting whether the sound hole of the speaker is blocked and prompt the user not to block the sound hole of the speaker by hands after a preset time period; and
    prompt the user to repair the sound hole when the sound hole of the speaker continues to be blocked.

* * * * *